(12) United States Patent
Mazzone et al.

(10) Patent No.: US 7,654,460 B2
(45) Date of Patent: *Feb. 2, 2010

(54) OPTICAL READING APPARATUS

(75) Inventors: Claudio Mazzone, Crespellano (IT);
Lorenzo Girotti, Bologna (IT); Marco Mallegni, Galliera (IT)

(73) Assignee: Datalogic Automation S.R.L., Bologna (IT)

( * ) Notice: Subject to any disclaimer, the term of this patent is extended or adjusted under 35 U.S.C. 154(b) by 104 days.

This patent is subject to a terminal disclaimer.

(21) Appl. No.: 11/689,777

(22) Filed: Mar. 22, 2007

(65) Prior Publication Data

US 2007/0158422 A1    Jul. 12, 2007

Related U.S. Application Data

(63) Continuation of application No. 10/167,991, filed on Jun. 10, 2002, now Pat. No. 7,195,162.

(30) Foreign Application Priority Data

Oct. 5, 2001   (EP)   .................. 01830631

(51) Int. Cl.
   *G06K 7/10*   (2006.01)
(52) U.S. Cl. ............. 235/454; 235/462.01; 235/462.38; 235/462.42
(58) Field of Classification Search ................. 235/454, 235/462.01, 462.14, 462.24, 462.38, 462.42
   See application file for complete search history.

(56) References Cited

U.S. PATENT DOCUMENTS

| 4,916,441 | A  | 4/1990  | Gombrich        |
| 4,983,818 | A  | 1/1991  | Knowles         |
| 5,140,141 | A  | 8/1992  | Inagaki et al.  |
| 5,479,001 | A  | 12/1995 | Kumar           |
| 5,576,530 | A  | 11/1996 | Hagerty         |
| 5,767,500 | A  | 6/1998  | Cordes et al.   |
| 5,808,289 | A  | 9/1998  | Becker          |
| 6,065,676 | A  | 5/2000  | Ring et al.     |
| 6,460,768 | B2 | 10/2002 | Ring et al.     |
| 6,575,368 | B1 | 6/2003  | Taburrini et al.|

FOREIGN PATENT DOCUMENTS

| JP | 07-065099 A | 3/1995  |
| JP | 10-334172 A | 12/1998 |

OTHER PUBLICATIONS

European Search Report for European Patent Application Serial No. 01830631.6.

(Continued)

*Primary Examiner*—Ahshik Kim
(74) *Attorney, Agent, or Firm*—IPLM Group, P.A.

(57) ABSTRACT

An automatic optical reading apparatus (1) having a light emitting section (26), a light receiving section (27) and an outside interface section (36). A first unit (2) houses at least one of the emitting section (26) and the receiving section (27) and a second unit (3) houses at least the outside interface section (36). The first unit (2) and the second unit (3) are mutually connectable in at least two different mutual orientations.

11 Claims, 5 Drawing Sheets

OTHER PUBLICATIONS

"Bar Code Reader BCL 40 with Integrated Decoder Connector Unit MA 10", Leuze Electronic.
"Bar Code Reader BCL 80 with Integrated Decoder Connector Unit MA 10", Leuze Electronic.
Protest Against European Patent 01 830 631.6, EPA Form 2300, May 14, 2007.
Leuze electronic Invoices for BCL 40 and MA 10 dated Apr. 14, 2000 and Sep. 28, 2001.
Leuze electronic Delivery Notes for BCL 40 and MA 10 dated Apr. 14, 2000 and Sep. 28, 2001.
Leuze electronic Invoices for BCL 80 and MA 10 dated Mar. 27, 2000 and Sep. 26, 2001.
Leuze electronic Delivery Notes for BCL 80 and MA 10 dated Mar. 27, 2000 and Sep. 26, 2001.

OPTICAL READING APPARATUS

RELATED APPLICATIONS

This application claims priority to European Application No. 01830631.6 filed Oct. 5, 2001 and U.S. application Ser. No. 10/167,991 filed Jun. 10, 2002, now U.S. Pat. No. 7,197,162 issued on Mar. 27, 2007.

TECHNICAL FIELD

The present invention relates to an optical reading apparatus, and, preferably to an automatic optical reading apparatus.

BACKGROUND OF THE INVENTION

In general, an optical reading apparatus comprises:
a light emitting section, comprising at least one light source—for example one or more LEDs or a laser light source—, optional optical shaping and/or focusing components for the light emitted by the light source, and optional means for scanning the light emitted by the light source, for example one or more rotating or oscillating mirror surfaces, and
a light receiving section comprising at least one photosensitive element, for example one or more photodiodes or a CCD or C-MOS device, generating an electrical signal having an amplitude proportional to the light incident on it, and optional optical components for collecting and/or focusing the light onto the photosensitive element.

The optional shaping and/or focusing components of the emitting section and the optical collecting and/or focusing components of the receiving section can partly or totally coincide. The casing of an optical reading apparatus thus comprises an emitting window, a receiving window, or an emitting/receiving window.

An optical reading apparatus generally comprises also devices for processing the output signal of the photosensitive element or elements of the receiving section, such as an amplifier, an analogue-to-digital converter, or a sampler.

In the particular case of bar code or two-dimensional two-color—commonly black and white—code readers, moreover, a digitizer can be comprised, in addition to or as an alternative to the analogue-to-digital converter or to the sampler.

Moreover, an optical reading apparatus can comprise a microprocessor processing unit. In the case of an optical code reader such a processing unit, commonly indicated as a "decoder", is intended to decode the optical code being read, including the optional reconstruction of the optical code from partial scan lines. In the case of other optical reading apparatuses, such a processing unit is intended to perform the specific function of the optical reading apparatus, for example to determine measures of distances and volume of objects, to detect their presence, etcetera.

The expression "automatic" is used as opposed to the "portable" or "manual" terms, that is to say, to indicate an optical reading apparatus to be used without human actuation. Such apparatuses, also known as "unattended scanners", are used, for example, at a conveyor belt (or other handling means) on which items to be detected travel, or at a fixed station where an operator manually enters the items to be detected, or also on machinery moving the optical reader, such as for example on a forklift in a store. Item detection can comprise the reading of an optical code and/or the measurement of a distance and/or of a volume, etcetera.

An automatic optical reading apparatus generally is part of a complex system, wherein it interacts with other optical reading apparatuses, other electro-optical devices such as height sensors, other electrical, electro-mechanical and/or electronic devices, in particular for data processing.

More in particular, the output signal of the photosensitive element of the receiving section, optionally treated and/or processed by the above-mentioned additional components, can be transmitted outside the optical reading apparatus to an external processing unit for further processing. Moreover, the information content detected by the optical reader (the particular code read, the determined distance or volume, an ON/OFF signal, etcetera) is typically transmitted outwards, for example in a control unit of an automatic item sorting system, in the management of a store, in an automatic machinery, a cash register, etcetera.

Moreover, besides the necessary power supply, an optical reading apparatus typically receives one or more input control signals. For example, in a system for detecting items travelling on a conveyor belt, besides one or more optical code readers oriented so as to read an optical code wherever arranged on the surface of an item and an optional device for measuring volumes, auxiliary devices may be present, such as a sensor for detecting the presence of an item on the conveyor belt, suitable for emitting a signal to actuate the optical reading apparatuses and the other components; a device for measuring the speed of the conveyor belt as a parameter to be taken into account in the processing of the photosensitive element output signal; devices for measuring the height and/or position of the item on the conveyor belt, intended to provide useful indications for focusing the optical code and, more in general, for performing a good reading.

The connection of each optical reading apparatus to the power supply and/or to the other devices of the system where it is used, such as the above auxiliary devices and/or the external processing unit, is typically realized via cable and preferably through removable connectors, because of the complexity of the connections themselves, which often makes the use of a single cable impossible, and because many connections are standardized.

As an alternative or in addition thereto, in some applications there can be provided a cordless interface through radio units and antennae or infrared transceivers.

An automatic optical reading apparatus therefore generally comprises an outside interface section.

In an optical reading apparatus, the emitting section and the receiving section, which comprise fragile components, are especially subject to wear and failures. In case of failure or breakage of a component of a known optical reading apparatus, the entire apparatus must be replaced at least at the end user's level.

In fact, the integrity of the casing of known optical reading apparatuses, housing all the emitting, receiving and interface sections, as well as the above optional additional components, cannot be tampered by the end user due to the safety regulations, in particular in the case of laser light sources.

The replacement of the entire optical reading apparatus requires an in-depth knowledge of the entire system, since the substitute optical reading apparatus and the components interacting with it must at least be connected again, resulting in a time-consuming and costly operation.

Known optical reading apparatuses are not only produced in a wide range of functional performances, but also in a range of layouts.

In particular, the exit of connection cables or connectors from the casing of common optical reading apparatuses may be on a wall of the casing of the optical reading apparatus,—generally known as "interface wall"—, opposed to or adjoining a wall of the casing containing the light emitting/receiving window. The antennae and transceivers provided for cordless communication have a similar distribution on the casing of the optical reading apparatus.

The installation of a particular known automatic optical reading apparatus is sometimes difficult due to the restricted space available, which does not allow installing the apparatus with its wall containing the emitting/receiving window facing the intended reading field due to the space taken up by the connection cables at a predetermined wall of the apparatus casing. This applies to a greater extent in case of interface through connectors, that can take up a space even equal to 30-40% of the overall size of the optical reading apparatus.

Also in case of cordless communication, given the directionality of typically used antennae and the need for conjugated transceivers to face each other, the predetermined mutual orientation of the wall containing the emitting/receiving window and of the interface wall does not always coincide with the optimum arrangement of the optical reading apparatus in the complex system where it is used.

In these cases, it is necessary to use a different optical reading apparatus, wherein the interface wall is arranged in a different manner with respect to the wall containing the emitting/receiving window, or to use light returning or deflecting mirrors. The first solution implies the need of producing—and thus assembling and stocking—optical reading apparatuses having identical or equivalent performance, differing in the outside casing only.

The second solution implies even more considerable disadvantages. In fact, the installation of the optical reading apparatus together with the necessary deflecting mirrors implies complex alignment procedures.

In known optical reading apparatuses, the control of the analogue components of the emitting section and of the receiving section is performed by an electronic controller, which however is in turn controlled and programmed through algorithms residing in the single microprocessor processing unit present, that is to say, the decoder in the case of an optical code reader, or the processing unit intended to determine distances and volumes in the case of measuring devices.

In optical reading apparatuses the need may arise of configuring some parameters of the apparatus internal components on the spot. Such parameters comprise, among the others, the gain of signal amplifiers and preamplifiers, the band-pass of the various electric and electronic components, the switching thresholds applied in the digitalization of the output signal of the photosensitive element (or of such output signal after processing through the analogue-to-digital converter or the sampler), the scanning speed or speed profile of the light beam in the case of a laser reader, for example the speed profile of a motor for moving a scanning mirror or mirror system, as well as some parameters of the treatment and/or processing algorithms of the output signal of the photosensitive element.

As a general rule, the programming of such parameters, in particular of analogue component parameters, requires a fine tuning on the spot, and thus the presence of a high-level operator both during the first installation of the optical reading apparatus and during replacement thereof, in case of failure or breakage of a component.

The complex systems wherein the optical reading apparatuses are installed are often provided with a certain redundancy, in particular, with a redundant number of optical code readers with at least partly superimposed reading areas to ensure good reading performances in case of particularly damaged optical codes.

SUMMARY OF THE INVENTION

In the present description and attached claims, the expression "optical reading apparatus" is used to indicate optical code readers, to which reference shall be mainly made merely by way of an example, as well as devices for measuring distances, devices for measuring volumes and devices for detecting the presence of objects.

In the following description and claims, the expression "optical code" is used to indicate bar codes, "stacked" codes—that is, with more stacked bar sequences—, two-dimensional codes, color codes and the like.

In the present description and attached claims, the term "digitizer" is used to indicate a device suitable for receiving an input signal having more values, be it either a continuous analogue signal or a signal sampled over time and optionally quantized, for example a signal in the grey scale, and for providing a two-level output signal, in particular representative of the relative sizes of bars and spaces of a bar code, or more in general, of the presence and absence of the elements forming the particular optical bar code being read.

In the present description and attached claims, the expression "outside interface section" is used to indicate the totality of both physical—such as cables and connectors—and cordless communication devices suitable for allowing the above interaction of the optical reading apparatus with the system of which it is part, as well as the optional interface electronics and the software controlling, for example, the data communication protocol.

The technical problem at the basis of the present invention is that of providing an optical reading apparatus which should be of a simpler and more versatile installation, maintenance and manufacture.

The invention relates to an automatic optical apparatus, comprising a light emitting section, a light receiving section and an outside interface section, characterized by comprising a first unit housing at least one of the emitting section and the receiving section, and a second unit housing at least the outside interface section, the first unit and the second unit being mutually connectable.

The provision of a modular device allows minimizing the components to be replaced in case of failure. Moreover, in case of failure of the first unit, it is not necessary to disconnect and reconnect any connection cables of the outside interface section.

Moreover, the provision of a modular device allows simplifying production and reducing supply on hand, since a single first or, respectively, second unit can be produced for coupling to second or, respectively, first units, differing in function and/or layout. Moreover, the provision of a modular device allows selecting among different units during installation, based on factors external to the optical reading apparatus, for example it allows selecting units of a different layout based on space factors.

In an embodiment, the first unit houses both the emitting section and the receiving section, thus acting as a reading head.

In an embodiment of the present invention, the first unit has a first casing and the second unit has a second casing, the first and the second casing exhibiting conjugated removable fixing means suitable for allowing a mutual connection of the first and of the second casing in at least two different mutual orientations.

Such a provision exhibits the advantage of making it possible to decide, during installation, the optimum mutual orientation of the two units based on the complex system wherein the optical reading apparatus is to be installed, in particular based on space considerations. The above provision obviates to such disadvantages of known optical reading apparatuses as described above.

Preferably, the first casing exhibits an emitting and/or receiving window arranged in an orthogonal wall with respect to a wall for coupling with the second unit.

As an alternative, the first casing exhibits an emitting and/or receiving window arranged in an opposed wall with respect to the wall for coupling with the second unit.

In the first or in the second case, the second casing exhibits an interface wall, preferably arranged orthogonally with respect to a wall for coupling with the first unit.

As an alternative, the second casing exhibits an interface wall which is arranged opposed with respect to the wall for coupling with the first unit.

Even though an embodiment wherein the emitting and/or receiving window and the interface wall are both arranged in walls orthogonal to the coupling walls is particularly advantageous, since it is then possible to change the mutual orientation of the planes containing them, also the other possible combinations are practically advantageous.

In fact, the emitting and/or receiving window exhibits an intrinsic directionality due to the direction of the scanning line—even though it is sometimes insensitive to a 180° rotation, as in bi-directional readers—so that its orientation, even though in a determined plane with respect to the interface wall, may be necessary. Similarly, since the interface wall may exhibit a high number of connectors, its orientation, even though in a predetermined plane with respect to the wall containing the emitting/receiving window, may turn out to be profitable to avoid or reduce crossing of the connection cables and the interposition of connection cables in the optimum emitting and receiving path of an antenna or an infrared interface transceiver.

Preferably, a coupling portion of the first unit and a coupling portion of the second unit exhibit a shape selected between rectangular, circular and of a regular polygon with a certain number of sides, preferably at least four.

A shape of the coupling portions as a regular polygon with n sides allows n mutual orientations, a circular shape allows numberless mutual orientations, a rectangular shape allows two mutual orientations.

In the following description and attached claims, the expression "coupling portion" is used to indicate a portion of the coupling wall, the entire coupling wall or a flange extending at the coupling wall. Thus, the first and the second unit must not necessarily have the same size and shape at the coupling wall, rather they can be for example essentially parallelepiped with a circular or hexagonal coupling flange. Also, they can have a parallelepiped shape, a first unit having a square coupling wall and the other unit having a rectangular coupling wall and a square coupling portion, etcetera.

Preferably, the first and/or the second casing comprise a recess at the respective coupling wall.

Such a recess allows housing the cables and buses interconnecting the units.

More specifically, the first casing can exhibit a plurality of first removable fixing elements identical to one another and equally distributed along the perimeter of a portion for coupling with the second casing, and the second casing can exhibit a plurality of second removable fixing elements identical to one another and equally distributed along the perimeter of a portion for coupling with the first casing, the first fixing elements and the second fixing elements being conjugated.

In the present description and attached claims, the expression "conjugated removable fixing elements" is used to indicate threaded holes and screws, nuts and bolts, tabs and respective seats, bayonet joints, snap-wise coupling surfaces, and the like.

Moreover, in an embodiment, each unit comprises respective microprocessor processing means suitable for controlling the components of the respective unit.

In this way, the advantages of the modularity of the optical reading apparatus according to the invention further increase since the first and the second unit are capable of operating independently of one another.

Again for the purpose of further increasing the modularity of the optical reading apparatus, the first and the second unit preferably comprise means for storing the setting parameters of the respective components.

Even more preferably, in at least one of the first and the second unit means for controlling the transfer of the setting parameters between the storage means of the first unit and the storage means of the second unit are provided.

Such a provision allows facilitating the setting of the various parameters during installation and replacement of one of the two units.

The above provision obviates to the above described disadvantages of known optical reading apparatuses. In fact, during installation and through the parameter transfer control means, it is possible to initiate the copy of the parameter values set in each unit into the other unit. In this way, the operation of replacement of a unit can be carried out by non-skilled personnel, since it is sufficient to initiate—again through the parameter transfer control means—the copy of the parameter values set in the replaced unit from the non-replaced unit, without having to set them again.

The parameter transfer control means preferably comprises a manual control device of an automatic data download routine, such as for example a simple multi-position switch.

Typically, the optical reading apparatus also comprises an amplifier for the output signal of the photosensitive element of the receiving section, housed in one of the first unit and the second unit, preferably in the first unit.

Typically, the optical reading apparatus also comprises an analogue-to-digital converter or a sampler of the output signal of the photosensitive element of the receiving section, housed in one of the first unit and the second unit, preferably in the first unit.

Typically, the optical reading apparatus also comprises a digitizer housed in one of the first unit and the second unit, preferably in the first unit.

Preferably, moreover, the second unit houses the high heat generation components and the first unit houses the optical components.

In particular, by arranging the low heat generation components in the first unit and the decoder and/or the processing unit for determining distances and/or volume in the second unit, the casing of the first unit can be made so as to ensure a high protection against water, dust, and impurities, which might contaminate the optical parts of the emitting and/or receiving sections, typically according to the IP65 standard.

Preferably, the casing of the first unit is airtight.

More preferably, the casing of the first unit is made of a plastic material.

As an alternative or in addition, the emitting section and the receiving section are preferably housed in a unit other than the second unit, and the second unit is provided with cooling means.

Since the second unit does not contain the optical components, it does not need a high degree of protection against impurities, and it can thus be cooled in any manner, for example by providing its casing with openings and/or cooling fins, and/or making it in a metal material.

Such an arrangement allows increasing the operating temperature of the optical reading apparatus with respect to known devices, wherein all components, both optical and with a high heat generation, such as the processing unit and a power supply, are housed within a common casing, which must thus exhibit a high degree of protection.

In the present description and attached claims, the term "power supply" is used to indicate a component suitable for receiving a first voltage in input, typically a low-voltage continuous voltage or the supply mains voltage, and providing in output one or more levels of voltage suitable for feeding the optical, electromechanical and electronic components of the optical reading apparatus.

Typically, the interface section is suitable for connecting the optical reading apparatus to the external world, for example through serial ports, in a multidrop network, via communication bus with similar optical reading apparatuses, etcetera.

By arranging the interface section in the second unit according to the invention, there is the further advantage that, in case of failure or breakage of one of the components of the first unit, the second unit can continue to operate momentarily—along with the complex system wherein the optical reading apparatus is installed—until the first unit is replaced, even though without reading capability. In other words, it is not necessary to stop the overall system even if momentarily a single optical reading apparatus does not perform the reading, in particular, does not read optical codes.

As explained above, the complex systems wherein the optical reading apparatuses are installed are often provided with a certain redundancy, in particular, with a redundant number of optical code readers with at least partly superimposed reading areas to ensure good reading performances in case of particularly damaged optical codes. The momentary inefficiency of an optical reading apparatus, in particular of an optical code reader, may thus have no impact on the overall system performance when it is made according to the invention.

The interface section can comprise at least one cordless communication device.

Preferably, moreover, the second unit further houses a power supply.

Preferably, the second unit further houses means for digitally processing the signal detected by the receiving section.

In the case of an optical code reader, the digital processing means comprises means for decoding an optical code.

In the case of a device for measuring distances or volumes, the digital processing means is intended to calculate the distance or volume.

In an embodiment, the first unit comprises the emitting section and the optical reading apparatus comprises a third unit housing the receiving section.

As an alternative or in addition, the optical reading apparatus comprises at least one additional unit housing at least one of a further emitting section and a further receiving section.

In this way, the optical reading apparatus can tun out to be provided with two (or more) "reading heads" sharing some components, in particular the decoder or the processing unit intended to determine distances or volume. The additional reading head can be a backup one or, for example, can perform a scanning line not coinciding with the scanning line of the main reading head.

The above also applies to each third unit and/or to any additional unit; in particular, such a unit will be connectable according to at least two different orientations with respect to the first, the second and/or any other additional unit, and it can be provided with its own processing means suitable for controlling its components, with its own means for storing the parameters, and with its own means for controlling the setting parameter transfer between itself and the other units.

In a particularly preferred embodiment, the first unit houses the emitting section and the receiving section and first processing means, and the second unit houses the outside interface section and second processing means, the first unit and the second unit being mutually connectable in at least two different mutual orientations.

More preferably, each of the first and the second unit comprises means for storing the setting parameters of the respective components.

Even more preferably, in at least one of the first and the second unit means for controlling the setting parameter transfer between the storage means of the first unit and the storage means of the second unit are provided.

BRIEF DESCRIPTION OF THE DRAWINGS

Further features and advantages of the present invention will be illustrated with reference to embodiments represented by way of a non-limiting example in the attached drawings, wherein:

FIG. 3 schematically shows an optical reading apparatus according to the present invention in a non-assembled condition;

DETAILED DESCRIPTION OF THE PREFERRED EMBODIMENTS

Figure 1:
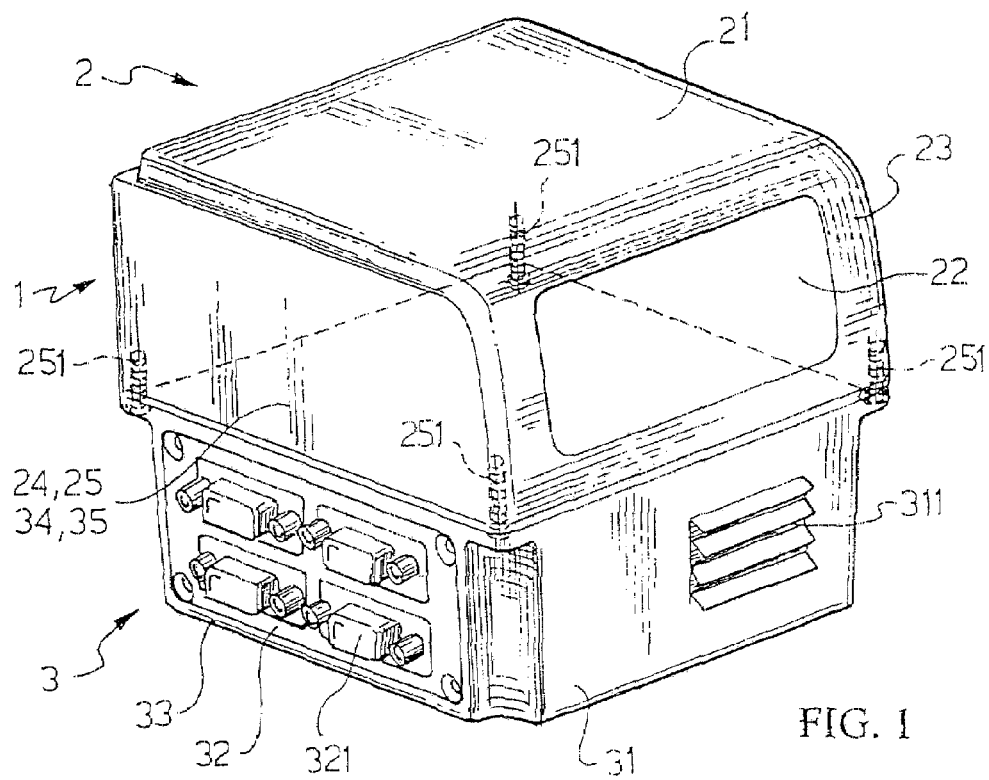
FIG. 1 shows a perspective view of a first embodiment of an optical reading apparatus according to the present invention.

The entire content of European Application No. 01830631.6 filed Oct. 5, 2001 and U.S. application Ser. No. 10/167,991 filed Jun. 10, 2002, now U.S. Pat. No. 7,197,162 issued on Mar. 27, 2007, is hereby incorporated by reference.

With reference to the figures an optical reading apparatus 1 according to the present invention comprises a first unit 2 and a second unit 3.

The first unit 2 has an outer casing provided with a light emitting/receiving window 22 on a wall 23.

The casing 21 is made, for example, of a plastic material and is free from openings.

The second unit 3 has an outer casing 31 provided with an input/output (I/O) panel 32 on an outside interface wall 33 or, briefly, I/O wall. The I/O panel 32 is shown as comprising a plurality of connectors 321, but this should be construed as purely illustrative. More generally, data communication cables, connectors and/or antennae, as well as a supply cable or a connector for a supply cable will be comprised.

The casing 31 is, for example, made of a metallic material and is provided with openings and/or cooling fans 311.

The first unit 2 and the second unit 3 are mutually connectable at a respective coupling portion, 24 and 34, of a respective coupling wall, 25 and 35.

Figure 2:
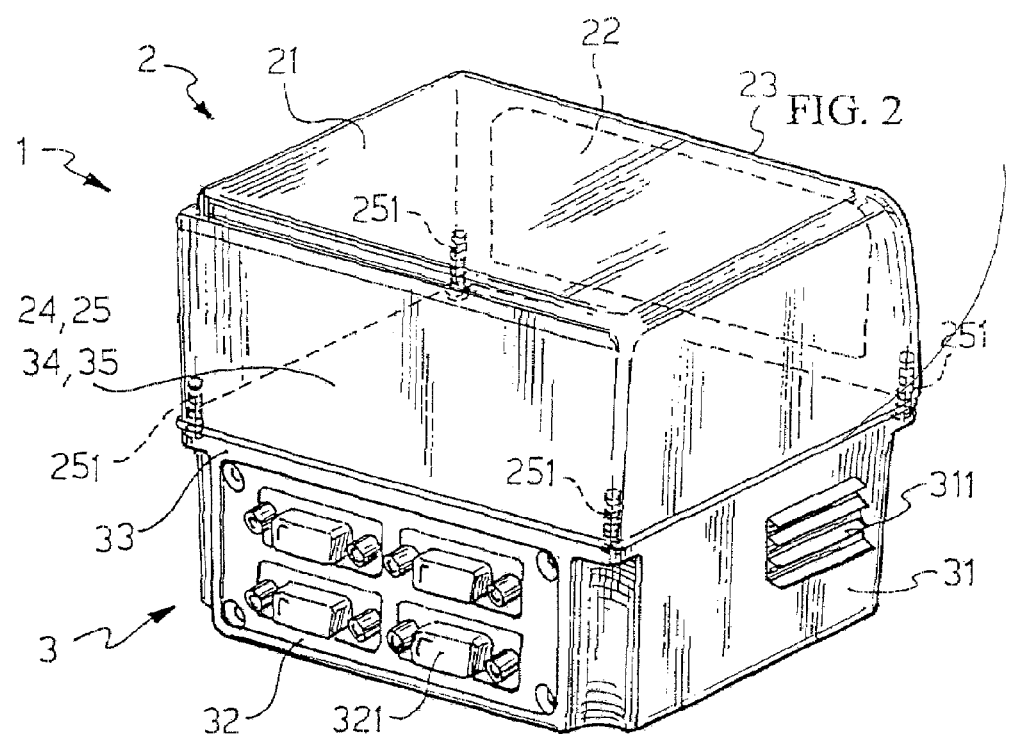
FIG. 2 shows a perspective view of the optical reading apparatus of FIG. 1 in a second assembled configuration.

According to an advantageous aspect of the present invention, in FIGS. 1 and 2 the coupling portions 24, 34 have a square shape and coincide with the coupling walls 25, 35. More specifically, the first and the second unit 2, 3 are coupled through four screw and threaded hole couplings 251, at the four vertices of the coupling portions 24, 34.

The square shape of the coupling portions 24, 34 allows the first unit 2 and the second unit 3 to be connectable in four different mutual orientations.

Thus, in the arrangement of FIG. 1, indicating as the front wall of the apparatus 1 the one containing the emitting/receiving window 22 of the first unit 2, the I/O wall 33 of the second unit 3, containing the I/O panel 32, is arranged in a left-hand side wall of the apparatus 1.

It is worth highlighting that the terms "front", "left-hand side" and similar are used for ease of description, thus establishing a reference which must only be construed as being relative. Indeed, in the installation of the optical reading apparatus 1, it can take up any absolute orientation so that the emitting/receiving window 22 is arranged in the desired manner with respect to the intended reading zone.

In the arrangement of FIG. 2, again indicating as the front wall of the apparatus 1 the one containing the emitting/receiving window 22, the I/O wall 33 of the second unit 3, containing the I/O panel 32, is arranged in a rear wall of the apparatus 1.

In the two remaining arrangements (not shown), the I/O wall 33 of the second unit 3, containing the I/O panel 32, is arranged in the same front wall of the apparatus 1 or in a right-hand side wall thereof.

The relative orientation of the two units 2, 3 and in practice the relative orientation of the emitting/receiving window 22 and of the I/O wall 33 can therefore be chosen during installation, given the orientation of the emitting/receiving window 22 with respect to the reading zone, according to the preferred exit side of the connection cables, having considered the available space and in view of the connection to the remaining devices and apparatuses of the complex system in which the optical reading apparatus 1 is installed, or in view of the location of a remote antenna or transceiver device, connected to an antenna or transceiver device for cordless communication of the optical reading apparatus 1.

In FIG. 3 interconnection cables 252 are visible exiting from the coupling wall 25 of the first unit 2 and relative interconnection connectors 351 arranged in a recess 352 of the coupling wall 35 of the second unit 3. The interconnection cables 252, when the optical reading apparatus 1 is assembled, are housed in the recess 352.

FIG. 3 differs from FIGS. 1 and 2 in that the coupling portion 24 of the first unit 2 is formed in a rectangular coupling wall 25.

Figure 4:
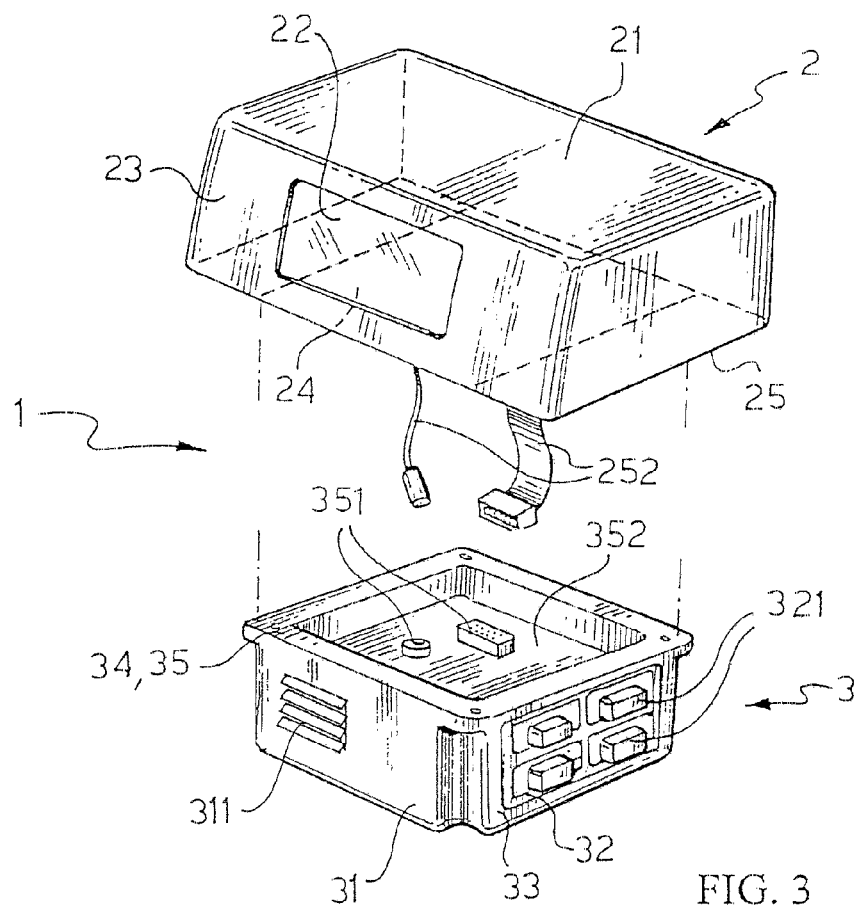
FIGS. 4 to 9 schematically show further embodiments of an optical reading apparatus according to the invention.

In the embodiment of FIG. 4, the casings 21 and 22 of the first and the second unit 2, 3 are cylindrical and can be coupled at circular coupling portions 24, 34 (coupling walls 25, 35). The mutual orientation of the two units 2, 3 can therefore be varied as desired.

Figure 5:
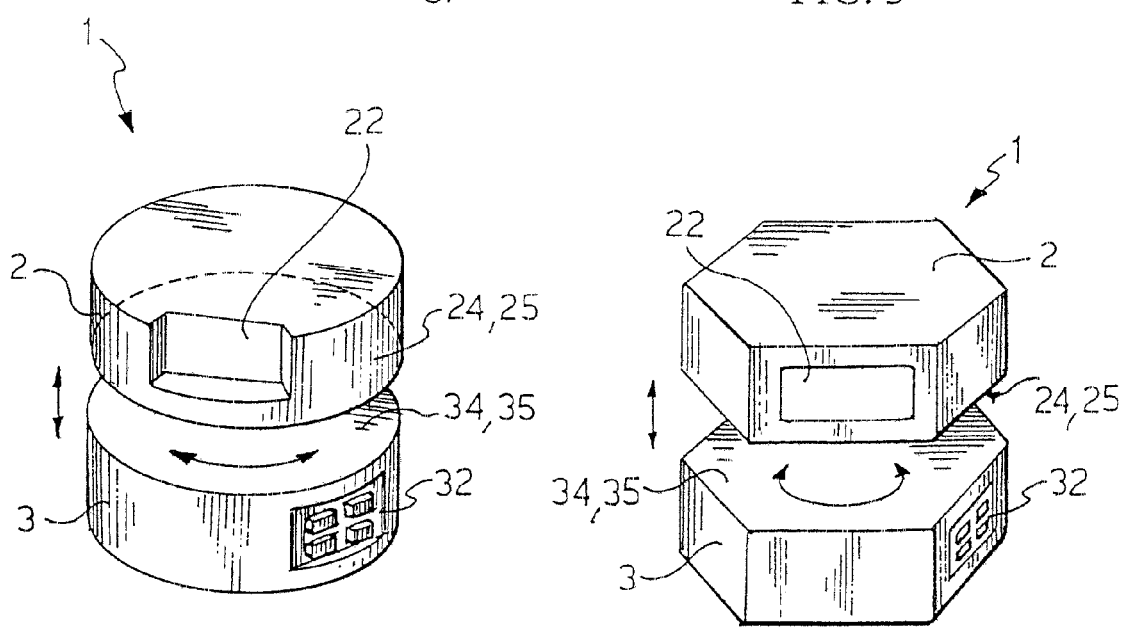

In the embodiment of FIG. 5, the casings 21 and 22 of the first and of the second unit 2, 3 are parallelepiped with a hexagonal base, allowing six different mutual orientations of the two units 2, 3.

In FIGS. 1 to 5, the wall 23 containing the emitting window 22 of the first unit 2 is orthogonal to the coupling wall 25 of the first unit 2 and the I/O wall 33 containing the I/O panel 32 of the second unit 3 is orthogonal to the coupling wall 35 of the second unit 3. Moreover, the emitting window 22 has its own longer side (i.e., the direction of the scanning line) parallel to the coupling wall 25.

Figure 6:
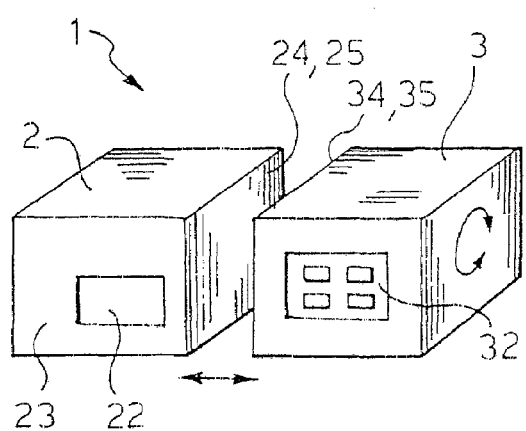
Figure 7:
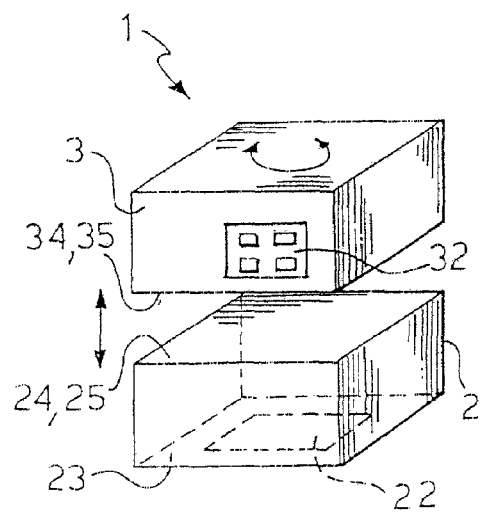
Figure 8:
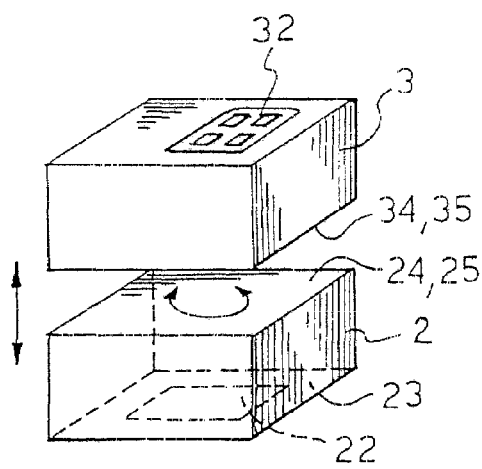
Figure 9:
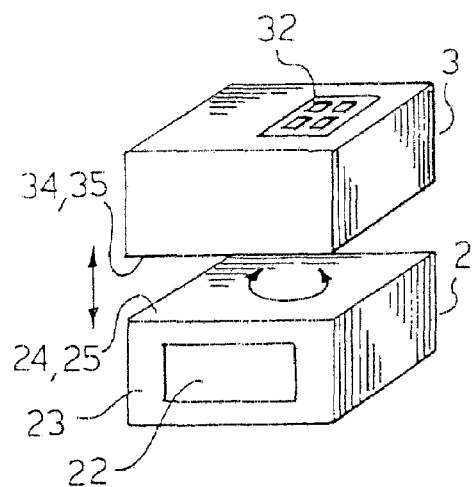

Although such an arrangement is preferred, in alternative embodiments the emitting window 22 can have its own longer side (i.e. the direction of the scanning line) orthogonal to the coupling wall 25 (FIG. 6), and/or the wall 23 containing the emitting window 22 can be parallel and opposite to the coupling wall 25 of the first unit 2 (FIGS. 7 and 8), and/or the I/O wall 33 can be parallel and opposite to the coupling wall 35 of the second unit 3 (FIGS. 8 and 9).

Figure 10:
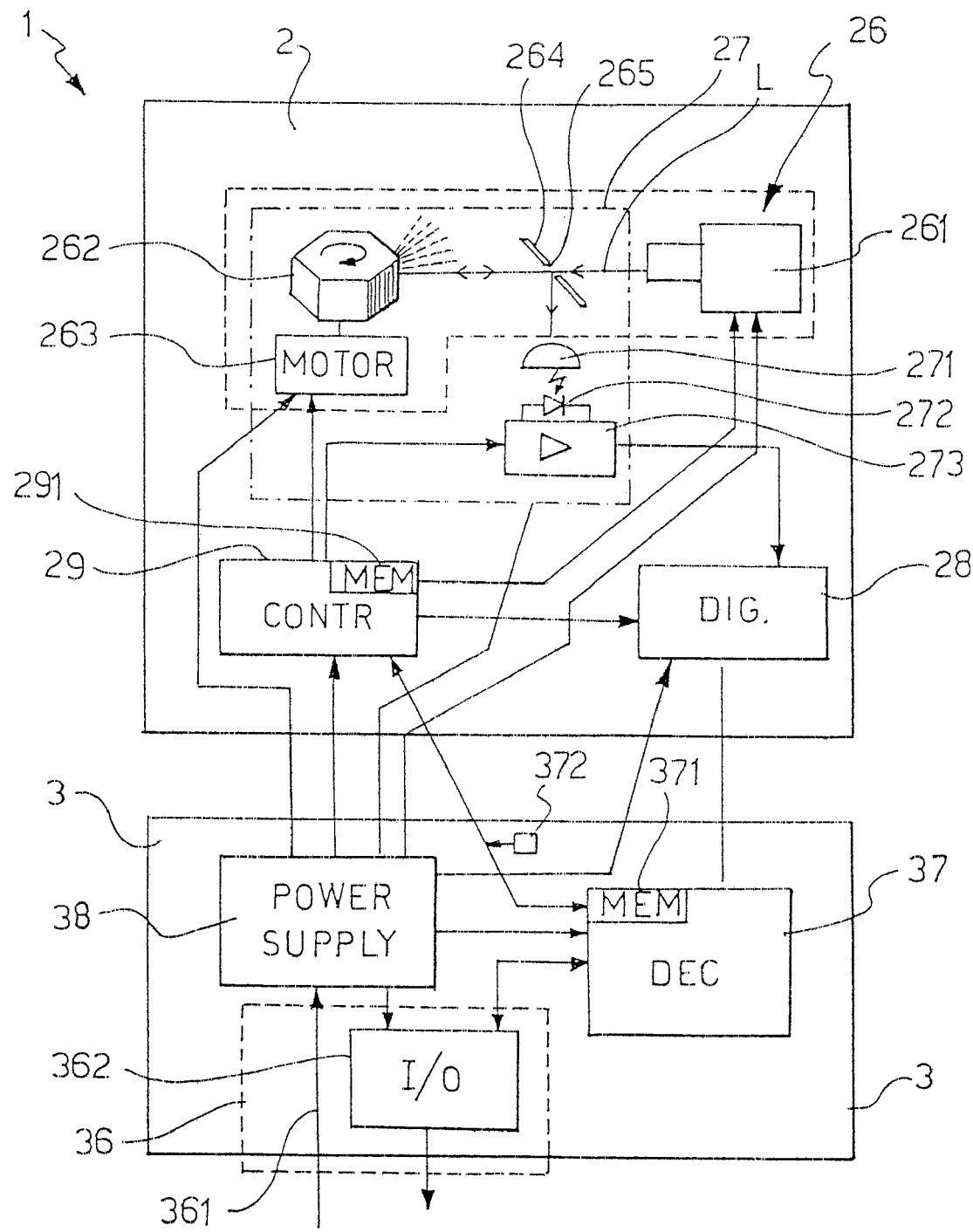
FIG. 10 schematically shows the arrangement of the internal components of an embodiment of an optical reading apparatus according to the present invention.

With reference now to FIG. 10, the first unit 2 houses a light emitting section 26.

The light emitting section 26 comprises a laser light source 261 and a polygonal mirror 262, caused to rotate by a motor 263. In the path of the laser light beam L between the laser light source 261 and the polygonal mirror 262 a flat mirror 264 is also interposed. The flat mirror 264 is sloped with respect to the direction of the laser light beam L and is equipped with a hole 265 for passage thereof.

The first unit 2 further houses a light receiving section 27.

The light receiving section 27 comprises, besides the polygonal mirror 262 and the flat mirror 264, an optical focussing element 271, for example a lens or a lens system, as well as a photosensitive element 272 with a respective amplifier 273.

The first unit 2 further comprises a digitizer 28 which, as an input, receives the output signal of the photosensitive element 272, amplified by the amplifier 273, and provides a two-level output signal.

The first unit 2 finally comprises a microprocessor processing unit or controller 29 for controlling the motor 263, the photosensitive element 272 and amplifier 273, the light source 261 and/or the digitizer 28.

Accordingly, the first unit 2 can function independently from the second unit 3.

The controller 29 comprises, according to an advantageous aspect of the present invention, storing means 291, suitable for containing the set values of the parameters relative to the components not just of the first unit 2, but also of the second unit 3. In case of replacement of the second unit 3, the values of the setting parameters of a new second unit 3 can therefore be copied from the storing means 291, without the need to carry out the calibration procedures once again.

The second unit 3 comprises an outside interface section 36, illustrated as comprising a supply cable 361 and a data input/output (I/O) module 362. Such a data input/output module can, for example, comprise one or more cables, in particular communication buses or cables for connection in a serial network or in a multidrop network, one or more radio modules, one or more transceivers, an interface electronics and/or software programs controlling, for example, the data communication protocol.

The second unit 3 further comprises a microprocessor processing unit 37, intended to decode the read optical code or to determine distances or volume, which allows the operation of the second unit 3 independently from the first unit 2.

The microprocessor processing unit 37, moreover, is intended to program the setting parameters of the controller 29 of the components of the first unit 2, such as, for example, the gain and the pass-band of the photosensitive element 272 and of the amplifier 273, the switching thresholds of the digitizer 28, the speed or the speed profile of the motor 263, besides to program some parameters of the signal processing algorithms implemented in the unit itself.

According to an advantageous aspect of the present invention, the microprocessor processing unit 37 comprises storing means 371 capable of containing the set values of parameters relative to the components not just of the second unit 3, but also of the first unit 2. In case of replacement of the first unit 2, such set values can be downloaded into the storing means 291 of the first unit 2, without the need to carry out the calibration procedures once again.

A manual control device, such as a multi-position switch 372 in the second unit 3, allows the initiation of an automatic download routine of the values of the parameters between the second unit 3 and the first unit 2.

The second unit 3, finally, comprises a power supply 38 for the distribution of the power received from the cable 361 to the various components of the first unit 2 and of the second unit 3.

Figure 11:
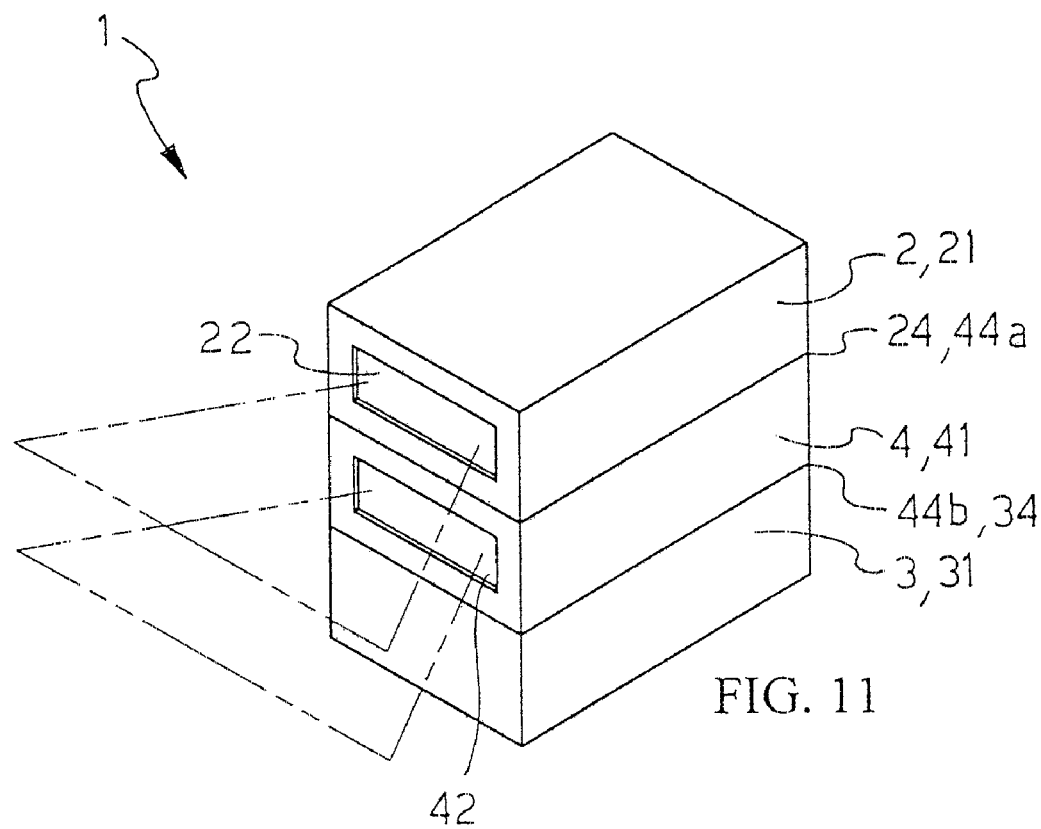
FIG. 11 schematically shows an embodiment of an optical reading apparatus according to the invention comprising three units.

FIG. 11 schematically shows an optical reading apparatus 1 according to the present invention wherein the first unit 2 houses the emitting section 26 (not shown) in a casing 21 equipped with an emitting window 22, and, besides the second unit 3 housing the outside interface section 36 (not shown), a third unit 4 is also present.

The third unit 4 houses the receiving section 27 (not shown) and has a third casing 41 provided with a receiving window 42. Of course, the emitting section and the receiving section are of a type not comprising common optical components.

The third casing 41 and the first casing 21, as well as the third casing 41 and the second casing 31, are coupled through conjugated removable fixing means (not shown) at respective coupling portions 24, 34, 44a, 44b of such a shape as to allow at least two different mutual orientations between the third casing 41 and the second casing 31 and/or the first casing 21, having a rectangular shape in FIG. 11.

Figure 12:
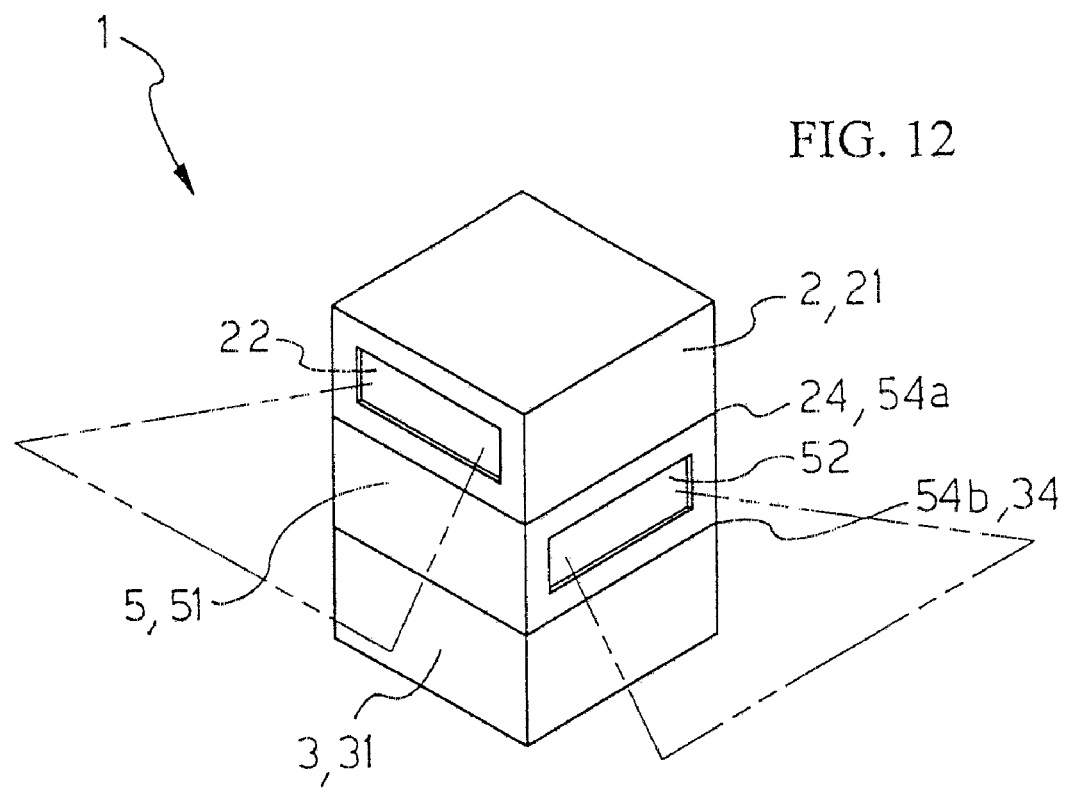
FIG. 12 schematically shows another embodiment of an optical reading apparatus according to the invention comprising three units.

FIG. 12 schematically shows an optical reading apparatus 1 according to the present invention wherein the first unit 2 houses the emitting section 26 and the receiving section 27 (both not shown) in a casing 21 provided with an emitting/receiving window 22, and, besides the second unit 3 housing the outside interface section 36 (not shown), a fourth unit 5 is also present.

The fourth unit 5 houses a further emitting section and a further receiving section (both not shown) and has a fourth casing 51 provided with an emitting/receiving window 52.

The fourth casing 51 and the first casing 21, as well as the fourth casing 51 and the second casing 31, are coupled through conjugated removable fixing means (not shown) at respective coupling portions 24, 34, 54a, 54b having a shape such as to allow at least two different mutual orientations between the fourth casing 51 and the second casing 31 and/or the first casing 21, having a square shape in FIG. 11.

It is manifest that other changes, variants, replacements and additions can be made to the previously described embodiments without thus departing from the scope of the present invention.

As an alternative to the single emitting/receiving window 22, the casing 21 of the first unit 2, as well as the casing 51 of the additional unit 5 of FIG. 12, can comprise distinct emitting and receiving windows.

The screws and threaded holes 251 are merely illustrative of removable fixing means for the connection of the two units 2, 3. Other removable fixing means can comprise nuts and bolts, tabs and relative seats, bayonet couplings, snap-wise coupling surfaces, etc.

For housing the interconnection cables 252, as an alternative or in addition to the recess 352 of the coupling wall 35 of the second unit 3, there can be a recess at the coupling wall 25 of the first unit 2.

The coupling portions 24, 34 and/or the coupling walls 25, 35 can have shapes other than those described. For example, they can have a substantially horseshoe form, which however allows just one mutual orientation, a rectangular or elliptical shape, which allows just two mutual orientations or else a regular polygonal shape, which allows a number of mutual orientations equal to the number of sides thereof.

Also as far as FIGS. 4, 5, 11 and 12 are concerned, the shape of the casings 21 and 31 of the first and of the second unit 2, 3 is not related to the shape of the coupling portions 24, 34, rather they can be of whatever shape, even a different one for the various units 2, 3, 4, 5. Thus, the coupling portions 24, 34 which are circular, polygonal, rectangular and square, respectively, can be formed as part of the coupling walls 25, 35 or else as flanges extended at the coupling walls 25, 35.

Though illustrated in FIGS. 6-9 with reference to square coupling portions 24, 25, the alternative arrangements of the emitting window 22 and of the I/O wall 33 with respect to the coupling walls 25, 35 apply with all of the possible shapes of the coupling portions 24, 34 and also in the presence of the third unit 4 and of one or more additional units 5, of course excluding in such a case their arrangement at the coupling walls between adjacent units.

In the embodiments of FIGS. 11 and 12, the mutual arrangement of the various units 2, 3, 4 and 2, 3, 5 can be changed as desired.

Also the components of the emitting section 26 and of the receiving section 27 illustrated and described are merely examples and can be replaced by other components suitable for carrying out the same functions.

Thus, for example, in the emitting section 26, the flat mirror 264 provided with the hole 265 can be missing, just as optical elements for focussing and shaping the laser light beam L can be included.

Moreover, the emitting section 26 can comprise scanning means other than the polygonal mirror 262. For example, an oscillating mirror or else a device for moving the laser light source 261 can be provided.

Also, the emitting section 26 can be of the type comprising a one-dimensional or two-dimensional array of light sources, for example of light emitting diodes (LEDs).

In the receiving section 27, the polygonal mirror 262 and the flat mirror 264 can be missing or replaced by different light-collecting optical elements.

The photosensitive element 272 can consist of a single photodiode, of a one-dimensional or two-dimensional array of photodiodes, of a linear or array CCD or C-MOS device.

Although they are illustrated as a single component, the photosensitive element 272 and the amplifier 273 can be separate components, each independently controlled by the controller 29 and fed by the power supply 38. The amplifier 273 can, moreover, be housed in the second unit 2 or even be missing.

In case of embodiments wherein the components of the light emitting section 26 and of the light receiving section 27 are totally separated, one or the other can be housed in the second unit 3 instead of in the first unit 2, as well as in a third unit 4.

The processing of the digital signal, in particular the decoding of an optical code or the determination of the measures or of the volume, can take place outside of the optical reading apparatus 1, in which case the microprocessor processing unit indicated as decoder 37 can be completely missing or can only be intended to store the setting parameters of the components of the first unit 2 or can be limited to the storing of the parameters of the microprocessor processing unit 29 of the first unit (if present); in such a case the outside interface section 36 shall be made up of a simple cable or cable connector for the communication of the output signal of the photosensitive element 272.

As an alternative to just the digitizer 28 housed in the first unit 2, for the treatment of the output signal of the photosensitive element 272, different components, such as an amplifier and an analogue-to-digital converter or a sampler, followed by a digitizer can be provided. Such components can be distributed between the first unit 2 and the second unit 3. Still as an alternative, some or all of such components can be external to the optical reading apparatus 1.

In the case of an optical reading apparatus 1 operating on signals at many levels, for example in the case of a color optical code reader, the digitizer 28 can be completely missing or replaced by an analogue-to-digital converter or by a sampler.

The memory 291 and the memory 371 can alternatively be external to the controller 29 and the decoder 37, respectively.

The manual control device 372 for downloading the values of the parameters can alternatively be arranged in the first unit 2.

As an alternative or in addition to the openings and/or cooling fins 311, the second unit 3 can comprise further cooling means, for example a fan.

The power supply 38 could alternatively be housed in the first unit 2. Still as an alternative, two (or more) power supplies can be included, one in each unit 2, 3 (and 4, 5 if present).

Even more generally, to obtain reading redundancy, the number of emitting sections and the number of receiving sections present altogether do not necessarily have to be the same, provided that such sections can be activated upon command so as to effectively operate as pairs of an emitting section and a receiving section each.

The communication and the transfer of the parameters between the various units 2, 3, 4, 5 present can be mono-directional or bi-directional.

The above specification provides a complete description of the invention. Since many embodiments of the invention can be made without departing from the spirit and scope of the invention, the invention resides in the claims hereinafter appended.

What is claimed is:

1. Automatic optical reading apparatus, comprising:
    a light emitting section;
    a light receiving section;
    an outside interface section;
    a first unit housing at least one of the emitting section and the receiving section;
    a second unit housing at least the outside interface section;
    the first unit and the second unit being mutually connectable; and
    the first and second unit each having respective microprocessor processing means for controlling the components of the respective unit;
    wherein each of the first and the second units has storage means for storing the setting parameters of the respective components.

2. Automatic optical reading apparatus according to claim 1, further comprising an amplifier of the output signal of a photosensitive element of the receiving section, housed in the first unit.

3. Automatic optical reading apparatus according to claim 1, further comprising an analogue-to-digital converter or a sampler of the output signal of a photosensitive element of the receiving section, housed in the first unit.

4. Automatic optical reading apparatus according to claim 1, further comprising a digitizer housed in the first unit.

5. Automatic optical reading apparatus according to claim 1, wherein the second unit further houses digital processing means of an output signal of the receiving section.

6. Automatic optical reading apparatus according to claim 5, wherein the digital processing means comprises means for decoding an optical code.

7. Automatic optical reading apparatus according to claim 1, wherein the first unit houses both the emitting section and the receiving section.

8. Automatic optical reading apparatus, comprising:
    a light emitting section;
    a light receiving section;
    an outside interface section;
    a first unit housing at least one of the emitting section and the receiving section;
    a second unit housing at least the outside interface section;
    the first unit and the second unit being mutually connectable; and
    the first and second unit each having respective microprocessor processing means for controlling the components of the respective unit;
    wherein each of the first and the second units has storage means for storing the setting parameters of the respective components; and
    wherein at least one of the first and the second unit has means for controlling the setting parameter transfer between the storage means of the first unit and the storage means of the second unit.

9. Automatic optical reading apparatus according to claim 8, wherein the parameter transfer control means comprise a manual control device of a download routine.

10. Automatic optical reading apparatus, comprising:
    a light emitting section;
    a light receiving section;
    an outside interface section;
    a first unit housing at least one of the emitting section and the receiving section;
    a second unit housing at least the outside interface section;
    the first unit and the second unit being mutually connectable; and
    the first and second unit each having respective microprocessor processing means for controlling the components of the respective unit;
    wherein each of the first and the second units has storage means for storing the setting parameters of the respective components; and
    wherein each of the first and the second unit has means for controlling the setting parameter transfer between the storage means of the first unit and the storage means of the second unit.

11. Automatic optical reading apparatus according to claim 10, wherein the parameter transfer control means comprise a manual control device of a download routine.

* * * * *